United States Patent [19]

Kelly

[11] Patent Number: 4,970,704
[45] Date of Patent: Nov. 13, 1990

[54] ACOUSTICAL GENERATOR

[75] Inventor: Raymond E. Kelly, Panama City, Fla.

[73] Assignee: The United States of America as represnted by the Secretary of the Navy, Washington, D.C.

[21] Appl. No.: 97,445

[22] Filed: Nov. 6, 1970

[51] Int. Cl.$^5$ .............................................. H04R 23/00
[52] U.S. Cl. ..................................... 367/142; 181/0.5; 181/120; 116/137 A
[58] Field of Search ................. 116/137 R, 137 A, 27; 181/0.5 VM, 0.5 A, 0.5, 120; 367/141, 142

[56] References Cited

U.S. PATENT DOCUMENTS 3,111,931 11/1963 Bodine ............................ 116/137 R
3,536,157 10/1970 Anstey ............................ 116/137 R Primary Examiner—Charles T. Jordan
Assistant Examiner—J. Woodrow Eldred
Attorney, Agent, or Firm—Harvey David; John Becker; Sol Sheinbein

[57] ABSTRACT

Disclosed is an acoustical energy generator having a venturi front section to which is attached a pair of rear tail pipes. A pair of return flow manifolds are respectively connected between said rear tail pipes and said front venturi section at such locations that the static pressure in the former are greater than the static pressure in either of the latter when a fluid is flowing therethrough. Controllable valves are optionally disposed in said return flow manifolds to regulate the fluid flow therethrough, and a freely rotatable flutter valve may be disposed at the common junction of said venturi section and tail pipes to facilitate the rapid transfer and/or cutoff of flow from the former to both of the latter in an alternating manner, and thereby effect a more positive generation of cavitation at a desired frequency of operation. A bridle is connected to the front end of the venturi section and a tractor vehicle is attached thereto by means of a tow cable. A position controller is optionally connected to the aforesaid tow cable or to the acoustical generator, either directly or indirectly as desired.

11 Claims, 2 Drawing Sheets

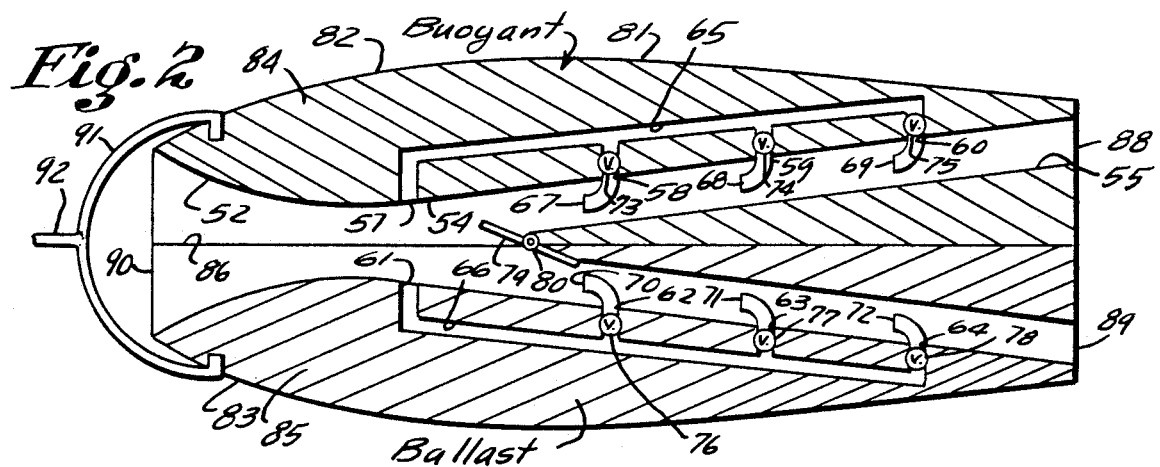
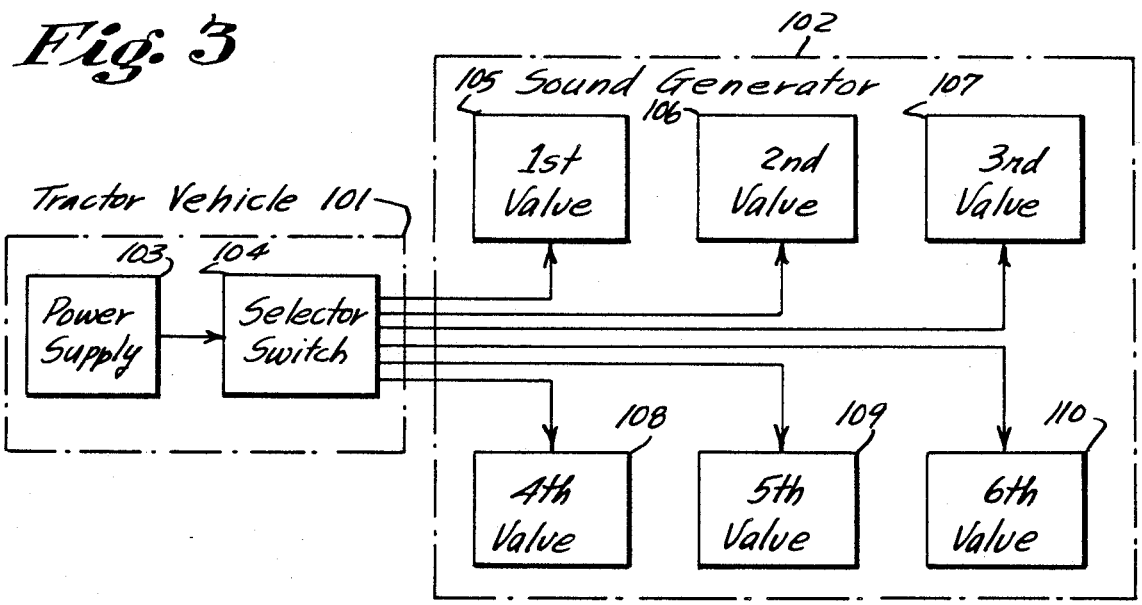
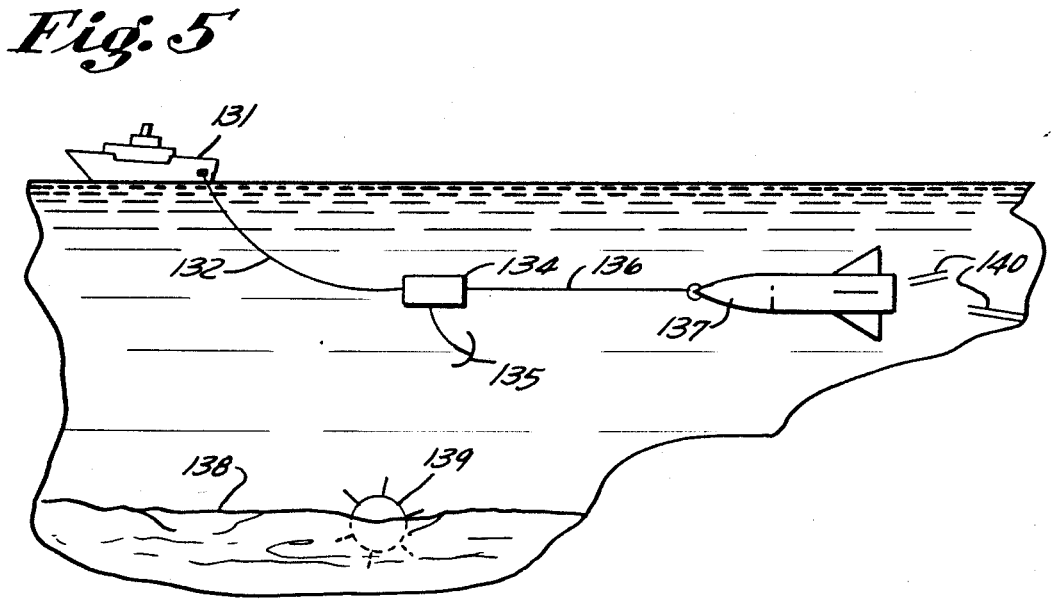

ACOUSTICAL GENERATOR

FIELD OF THE INVENTION

The present invention relates generally to acoustical energy devices, and, more particularly, it is a generator which produces sonic energy within a predetermined fluid medium as a result of the fluid in which it is operating acting therein and thereon. In even greater particularity, the subject invention is an underwater sound generator which employs fluidic pressure control techniques to timely and automatically modulate the water flowing therethrough in such manner as to effect a repetitive, rhythmic series of collapsing cavities within or at the exhaust ends thereof in response to being towed within water, sea water, or the like.

DESCRIPTION OF THE PRIOR ART

Heretofore, numerous devices have been employed for the purpose of generating sonic energy within water and other fluid mediums. For example, such things as explosive charges, fuel-fired explosions, electric spark devices, pressurized rupturable containers, rotating vanes, reciprocating pistons, motor actuated diaphragms, electroacoustical transducers, and the like, have been used in the past, and for many practical purposes have been eminently satisfactory. However, in many instances they have also left a great deal to be desired because of their respective power requirements, mechanical and electrical complexities, weight and bulk, environmental limitations, and cost of construction, maintenance, and use, and for many other reasons which are individual to each particular device and, thus, too numerous to mention here.

SUMMARY OF THE INVENTION

The instant invention overcomes many of the disadvantages of the prior art, in that it is constructed in such manner as to use the fluid medium within which it is submerged as the operative medium, is simple of structure, and easily and economically constructed and operated.

It is, therefore, an object of this invention to provide an improved sound source.

Another object of this invention is to provide an acoustical generator which incorporates fluidic techniques to effect the generation of sonic energy and automatically controls the frequency thereof.

Another object of this invention is to provide a sonic generator which uses the fluid medium within which it is submerged as the principal operative element therein.

Another object of this invention is to provide an improved cavitation generator.

A further object of this invention is to provide an improved method and means for broadcasting acoustical energy of predetermined amplitude and frequency throughout any suitable fluid medium, such as water, sea water, and the like.

Still another object of this invention is to provide an underwater sound source that facilitates changing and modulating the frequency of the acoustical energy being broadcast thereby.

Still another object of this invention is to provide an improved sound generator that may have few or no internal moving parts.

Another object of this invention is to provide an acoustical generator that may require no power other than that for the towing thereof.

Still another object of this invention is to provide a cavitation and sonic generator having considerable utility and long life.

Another object of this invention is to provide an acoustical generator that may be towed at high speeds with high Reynolds Numbers.

Another object of this invention is to provide a simple acoustical generator that may be easily and economically constructed, maintained, and operated.

Another object of this invention is to provide an improved method and means for detonating and/or neutralizing pressure and acoustical energy responsive marine mines.

Other objects and many of the attendant advantages will be readily appreciated as the subject invention becomes better understood by reference to the following detailed description, when considered in conjunction with the accompanying drawings.

BRIEF DESCRIPTION OF THE DRAWING

FIG. 2 is a schematic elevational view of another preferred embodiment of the invention;

FIG. 3 is a block diagram of an exemplary frequency control system that may be incorporated in the embodiments of the invention shown in FIGS. 1 and 2;

FIG. 5 is a particular representation of a system which employs the subject invention as an underwater sound source for the purpose of sweeping and neutralizing pressure responsive marine mines.

DESCRIPTION OF PREFERRED EMBODIMENTS

Figure 1:
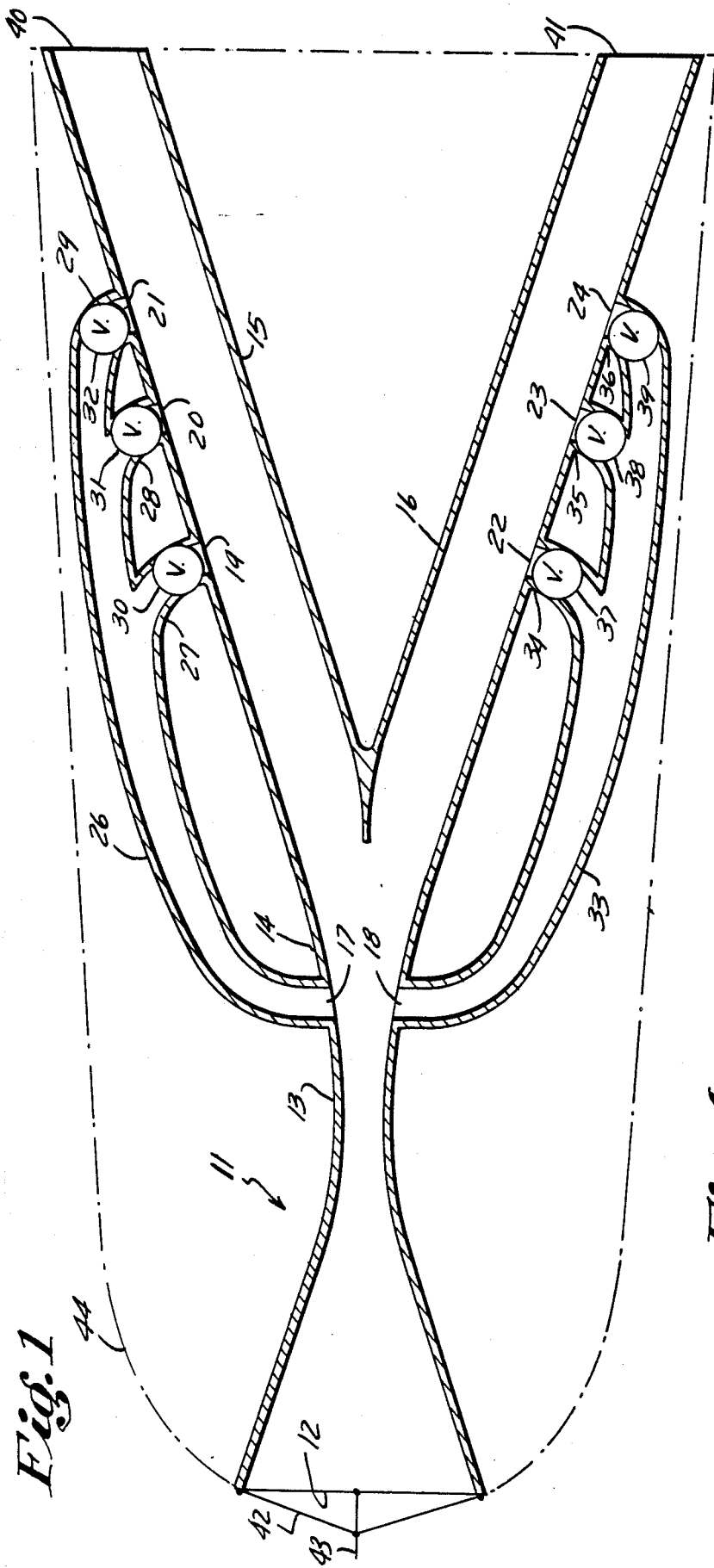
FIG. 1 is an elevational view of a preferred embodiment of the subject invention, mostly in cross-section, but with some of the elements thereof disclosed schematically.

Referring now to FIG. 1, there is shown a venturi type tube 11 having a converging entrance section 12, a throat section 13, and a diverging exit section 14. Connected to the exit section 14, at the rear end thereof, is a pair of rearwardly extending tail pipes 15 and 16 which, in this particular embodiment, are bifurcated, so as to substantially effect a Y-shape.

Adjacent to throat 13 of venturi 11, but slightly to the rear thereof, are a pair of oppositely disposed holes or ports 17 and 18 which extend through the wall of rear section 14 thereof. Likewise, a plurality of holes or ports—in this case, three: ports 19, 20, and 21—are located in and extend through the wall of tail pipe 15, and another plurality of holes or ports—again three: ports 22, 23, and 24—are located in and extend through the wall of tail pipe 16. In this particular representation of the invention, the aforesaid holes 17, 19, 20, and 21 and holes 18, 22, 23, and 24 are respectively in alignment and uniformly spaced; however, it should be understood that any or all thereof may be placed at such location as will cause the invention to operate in an optimum manner during any given operational circumstances. However, it should be appreciated that any number of such holes may be incorporated in the invention as would make it functional for any given purpose.

Obviously, it would be well within the purview of the artisan having the teachings presented herewith to select whatever number and dispositions of holes as would be required at any given time.

Connected between holes 17, 19, 20, and 21 is a return manifold pipe 26 having a trio of branch pipes 27, 28, and 29; and respectively mounted within said branch pipes 27, 28, and 29 are a like number of controllable valves 30, 31, and 32. Likewise, connected between holes 18, 22, 23, and 24 is a return manifold pipe 33 having a trio of branch pipes 34, 35, and 36; and respectively mounted within said branch pipes 34, 35, and 36 are a like number of controllable valves 37, 38, and 39.

The aforementioned valves are preferably of the manually actuated type; however, if desired, they may also be solenoid actuated, so that they may be opened and closed either by an electrical signal from some remote location and be operationally sequenced to provide variable frequency. Of course, the exact design thereof is intended to be left with the artisan constructing the invention.

The exit ends 40 and 41 of tail pipes 15 and 16 are open to the ambient environment, as is entrance end 12 of venturi section 11.

Numerous ways of pulling the invention through its environmental fluid medium are available and, of course, the one which facilitates the overall operation thereof should be selected; nevertheless, in the embodiment of FIG. 1, a bail or bridle 42 is connected to the front end of venturi 11 for such purpose, and a tow rope, line, or cable 43 is, in turn, connected thereto.

An optional housing 44 of any desired conventional construction and geometrical configuration may be used to contain the sound generating portion of the invention. Other than said sound generating portion, said housing may be empty, filled with appropriate potting material, partially filled with a suitable buoyant material in the upper portion and a suitable ballast material in the lower portion thereof. Said housing may, of course, be streamlined or not, as circumstances warrant. Because housing 44 and the aforesaid concomitant features are not absolutely necessary to the operation of the invention they are either schematically depicted in FIG. 1, or they are not shown at all.

Numerous other design features and constructions may obviously be incorporated in the embodiment of the invention illustrated in FIG. 1 without violating the spirit and scope thereof. For example, although only two tail pipes are shown as being connected to rear end 14 of venturi section 11, any number thereof in any preferred arrangement may be used, if so desired. Moreover, although the structure of venturi section 11, tail pipes 15 and 16, and return by-pass pipes 26 through 29 and 33 through 36 are all shown as being integrally connected—that is, made in one piece to effect a unitary device—they may be connected as separate sections by any suitable means—such as by welding, bolted flanges, or the like. Also, all of the aforesaid elements are shown as being made of metal, but it should be understood that plastics, wood, or any other suitable material may be used as the construction materials therefor to optimize the invention for any predetermined operational situations.

Obviously, the flow direction of the operative fluid medium is from left to right, as the subject invention is viewed in FIG. 1. Accordingly, the dimensions designed within said flow path should be such that both the entrance and exit cross-sectional areas of the venturi section 11 are greater than that of the throat section thereof. Moreover, the cross-sectional area of each of tail pipes 15 and 16 should be greater at their respective port hole positions than the area of the port hole positions of venturi exit section 14. Of course, the cross-sections of all thereof may be any that would facilitate construction and operation of the invention. Hence, they may be round, oval, square, rectangular, etc. In addition, although tail pipes 15 and 16 are shown as being Y-shaped with the tail of the Y facing forward, they may be designed to have predetermined curvatures, parallel straight pipes, or any desired combination thereof.

Furthermore, it should be understood that the cross-section of entrance 12 of venturi 11 may be of whatever size as will result in the least drag within the ambient fluid medium, while providing optimum fluid flow through the entire device.

Again, one skilled in the art could obviously make the proper design selections of all of the foregoing dimensions and parameters to accomplish any intended purpose.

The species of the invention schematically depicted in FIG. 2 will now be discussed briefly. Shown is a venturi section 51 having a converging entrance section 52, a throat section 53, and a diverging exit section 54, and attached to the rearward end thereof are a pair of tail pipes 55 and 56 having a somewhat "Y" configuration. Holes 57, 58, 59, and 60 are respectively located in venturi exit section 54, and tail pipe 55, and holes 61, 62, 63, and 64 are likewise located in venturi exit section 54 and tail pipe 56, respectively. A first manifold pipe 65 interconnects holes 57 through 60, and a second manifold 66 interconnects holes 61 through 64. A plurality of elbow-like input extension tubes 67, 68, and 69 are respectively attached to manifold 65 at holes 58, 59, and 60 in such manner that the open ends thereof point forward, so as to be responsive to the impact pressures occurring within tail pipe 55 as a result of water or some other fluid medium flowing therethrough. Similarly, another plurality of elbow-like impact extension tubes 70, 71, and 72 are respectively attached to manifold 66 in such manner that the open ends thereof point in the forward direction, so as to be responsive to the impact pressures occurring within tail pipe 56 as a result of water or some other fluid medium flowing therethrough.

A first plurality of solenoid and/or manually operated valves 73, 74, and 75 are located within the branches of manifold 65 which are connected to holes 58, 59, and 60; and a second plurality of solenoid and/or manually operated valves 76, 77, and 78 are located within the branches of manifold 66 which are connected to holes 62, 63, and 64.

At the junction of tail pipes 55 and 56, a freely rotatable (unpowered) damper or flutter valve or vane 79 is mounted by any suitable bearing means 80. Rotation thereof is such that when one of said tail pipes is open the other is at least partially closed, but closed as much as possible without preventing the rotation thereof. To effect such condition, vane 79 may be designed and angled if necessary to conform to and be complementary with the inside configuration of venturi exit 54 and entrances of said tail pipes 55 and 56.

A housing 81, preferably split in two halves 82 and 83, contain all of the aforementioned elements. The upper half 82 of housing 81 is optionally filled with or made of any suitable buoyant material or arrangement 84, and the lower half 83 thereof is optionally filled with or made of a material 85 that is heavier than buoyant material 84, so as to act as a ballast for the entire device. Said two halves 84 and 85 are connected at their abutting surface 86 by any suitable means 87, such as, for example, by welding, cementing, bolting, or the like. Housing 81 may, of course, have whatever geometrical configuration as would best suit its purpose during any particular operational circumstance.

As in the device of FIG. 1, exits 88 and 89 of tail pipes 55 and 56, as well as entrance 90 of venturi entrance 52, are open, so as to allow a fluid medium to timely flow therethrough, as the invention is towed within said fluid medium. For towing purposes, a bail or bridle 91 is attached to housing 81 at or near the front end thereof, and a rope, line, or cable 92 is attached thereto.

Also, like the embodiment of FIG. 1, the embodiment of FIG. 2 may be dimensioned, sized, shaped, etc., in such manner as will optimize it for any intended purpose.

Referring now to FIG. 3, there is disclosed a representative system which may be used to power and control the frequency of sound produced by the device of FIGS. 1 and 2.

A guided or guidable tractor vehicle 101, such as a ship, submarine boat, underwater tow vehicle, aircraft, or the like, is used to tow sound generator 102 through an environmental fluid medium. Of course, said tractor vehicle 101 would incorporate a propulsion system appropriate for the environment within which it is operating.

Sound generator 102 herewith represents any sound generator falling within the scope of this claimed invention, including those of FIGS. 1 and 2.

Tractor vehicle 101 contains an electrical power supply 103, the output of which is connected to the input of a selector switch 104 of a type that may be used to effectively connect a signal from power supply 103 to any number or all of valves 105 through 110 for the opening and closing thereof as desired. Hence, for such purpose, said valves 105 through 110 are preferably solenoid actuated valves which may be deactivated or overridden by the manual signal of a human operator. In this particular drawing figure, each trio of valves—that is, valves 105, 106, and 107, and valves 108, 109, and 110 are intended to represent the respective trios of valves disclosed in each of the devices of FIGS. 1 and 2. It should be understood, however, that even though only six valves are depicted in the devices of FIGS. 1, 2, and 3, any number thereof may be incorporated therein, if so desired and operational circumstances so warrant.

In the event the operation of the subject would be facilitated or improved by combining tractor vehicle 101 with sound generator 102 in such manner as to make a unitary device thereof, it, of course, should be understood that so doing may be done without violating the spirit or scope of the invention.

Figure 4:
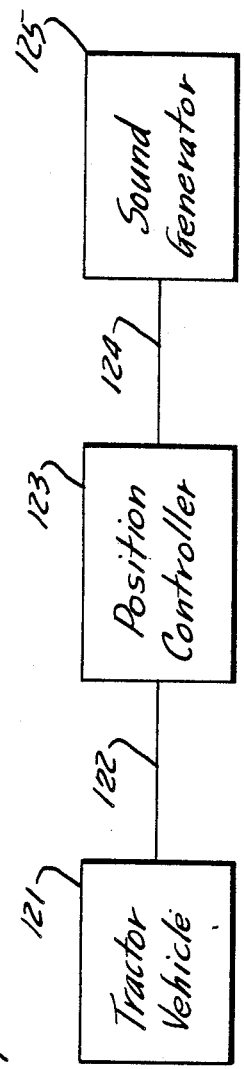
FIG. 4 is a very general teaching, in block diagram form, of a system incorporating the subject invention which may be operated within any suitable fluid environmental medium.

FIG. 4, as previously suggested, represents in broad scope the type of system which may incorporate or constitute the subject invention to an advantage.

Again, there is shown a tractor vehicle 121 which is series connected via a first tow cable 122, a position controller 123, a second tow cable 124 to a sound generator 125, the latter of which may be one or more of the devices of FIGS. 1, 2, and 3. With the exception of the latter, each of the aforementioned components operationally associated therewith are conventional, commercially available, and thus well known in the art.

Hence, it is to be understood that it is their interconnections and unique interactions with the sound generator 125 which cause the new and improved results to be effected thereby.

Referring now to FIG. 5, there is shown a typical application of the subject invention, viz., using it as a means for detonating and neutralizing sound or other pressure responsive marine mines.

In this figure, a ship 131 constitutes the required tractor vehicle. A cable 132 extends therefrom down into water 133 to a predetermined weight 134, to which is optionally connected a diverter 135. Another cable 136—or a continuation of cable 132—connects a sound generator 137 to the aforesaid weight 134. In this particular view, weight 134 and diverter 135 are used to position sound generator 137; however, it should be understood that the positioning means therefor may be designed to be an inherent part therein, if so desired. Laying on the sea floor 138 (or partly or completely submerged therein) is shown a marine mine 139 which is intended to be detonated by sonic energy 140, as acoustical generator 137 comes within range thereof. Of course, this particular arrangement may also be used to seismic and other exploratory operations, too.

MODE OF OPERATION

The operation of the instant inVention will now be discussed briefly in conjunction with all of the figures of the drawing.

As previously indicated, any fluid medium may constitute the ambient environment and operative element for the invention. However, in order to keep this disclosure as simple as possible, it will herewith be assumed that the operative and environmental medium is sea water.

As the sonic generator of FIG. 1 is pulled through the sea water, the water flows through the venturi and tail pipe sections thereof. Either at the outset or shortly after the towing thereof commences, a light positional imbalance occurs in the entire device and, thus, a slight pressure imbalance occurs in either tail pipe 15 or tail pipe 16. Than, at that time, water begins to flow through one or more of those manifold branches whose value is opened. For the sake of simplicity of disclosure, it will be assumed that valves 30 and 37 are open and all the rest thereof are closed. Also, assuming that initially the tail pipe imbalance is such that the water is flowing more through pipe 15 than through pipe 16, then some thereof is diverted through branch 27 of manifold 26 and back through hole 17 into the mainstream of the exit section 14 of venturi 11. This occurs because the static pressure in pipe 15 is greater than the static pressure adjacent hole 17 in section 14 as a result of the velocity being greater adjacent to said exit hole 17 than it is adjacent entrance hole 19, in accordance with Bernoulli's theorem.

As the water moves out of manifold 26 through hole 17, it diverts and directs the flow of the main stream from pipe 15 to pipe 16. The abrupt discontinuation of flow within pipe 15 causes a cavity to be formed therein, because the mass of water already in pipe 15 continues to move rearward and out exit 40. Such cavity thus moves toward and collapses at or near exit 40, causing the desired sound output.

At the time of sound generation at the rear end of pipe 15, the mainstream of the water is flowing through tail pipe 16. Hence, the static pressure adjacent to hole 22 becomes greater than that adjacent to hole 18, and water flows through manifold branch 34, open valve 37, pipe 33, and out hole 18, where it then diverts and directs the mainstream flow within rear section 14 of venturi 11 away from the entrance to pipe 16 and toward the entrance of pipe 15. The abrupt discontinuation of water flow within pipe 16 causes a cavity to be formed therein as a result of the mass of water already therein continuing its movement in the rearward direction and out exit 41. Then said cavity moves to and collapses at or near exit 41, thereby generating another sound signal.

The aforementioned process repeats back and forth between tail pipes 15 and 16 to cause sonic energy to be timely generated at the respective exits thereof. Of course, for any given towing speed, the frequency of such generated sounds is contingent upon the particular pairs of valves which are open at any given time within pipes 15 and 16, and it may be regulated or adjusted, within limits, by the proper setting of the valves either manually or by means of the system disclosed in FIG. 3.

The device of FIG. 2 operates in a manner similar to that of FIG. 1, with two exceptions: (1) Total pressures of the flowing water in the tail pipes are employed instead of static pressures; and (2) rotatable valve 79 may be employed to insure more complete and abrupt shut-off of the water flowing in the mainstream of that tail pipe being diverted at any given instant, thereby effecting more positive and efficient cavitation production and, therefore, in turn, generating sounds having more power.

As the sonic bursts are generated by the sound generators of the systems of FIGS. 4 and 5, they may be used for whatever purpose is intended. While the system of FIG. 4 is not intended to be limited with respect to the type of environment in which it functions or for the purpose it is operated therein, in the case of the system of FIG. 5 it may be used for the purpose of detonating marine mine 139, perhaps for the purpose of accomplishing underwater seismic or communication operations, or for any other purpose requiring the insonification of an aqueous or subaqueous medium, such as sea water or the like.

From the foregoing, it may readily be seen that the disclosed embodiments are quite simple, as far as structure and operation are concerned; nevertheless, in view of the capabilities and extensive utility thereof, they ostensively constitute a considerable advance in the sound generating art in general and in the underwater sound generating art in particular.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A generator adapted for operating within and upon a predetermined ambient fluid medium for producing sonic energy therein in response thereto, comprising in combination:

a first open-ended pipe means, having a front converging section, a throat section, and a rear diverging section, adapted for receiving and carrying a flowing portion of said predetermined fluid medium in response to being towed therethrough;

a plurality of rearwardly extending, open-ended tail pipe means connected to each other and to the rear end of said rear diverging section of said first pipe means in such manner as to form a common junction thereat and be capable of receiving the aforesaid portion of flowing fluid medium therefrom and for enabling the timely flow thereof therethrough;

a first plurality of ports, identical in number to the aforesaid plurality of rearwardly extending, open-ended tail pipe means, respectively disposed in substantial alignment therewith in the wall of the rear diverging section of said first pipe means at predetermined locations along the length thereof having given cross-sectional areas;

a second plurality of ports respectively disposed in the walls of said rearwardly extending, open-ended tail pipe means at locations along the lengths thereof having cross-sectional areas that are greater than the aforesaid given cross-sectional areas; and means respectively connected between said first and second plurality of ports for timely and successively returning some of the fluid medium flowing in said tail pipes to the rear diverging section of said first pipe means whenever the static pressures at said second plurality of ports exceeds the static pressures at said first plurality of ports, respectively, to thereby effect diversion of the fluid medium flowing in the rear diverging section of said first pipe means toward and out of the rear end of any of said tail pipe means except the one thereof from which said fluid medium was returned.

2. The device of claim 1 further characterized by means connected to the forward end of said first pipe means for the towing of said generator through said ambient fluid medium at predetermined speeds and Reynolds Numbers.

3. The device of claim 1 further characterized by housing means of predetermined geometrical configuration enclosing said generator, except over the front entrance of said first open-ended pipe means, and except over the rear exit ends of said plurality of open-ended tail pipe means.

4. The invention of claim 3 further characterized by:
buoyant means disposed within the upper portion of said housing means; and
ballast means disposed within the lower portion of said housing means.

5. The device of claim 1, wherein said fluid medium returning means comprises a plurality of pipe means respectively connected between the aforesaid first and second pluralities of ports for timely and successively transferring a portion of the fluid medium flowing within each of said tail pipe means back to the rear diverging section of said first pipe means in such manner as to effect successive diversions of the fluid medium flowing therein toward another of said tail pipe means, so as to successively effect cavitations therein which respectively travel to the rear ends thereof and produce predetermined sonic energy pulses as they pass therefrom into said predetermined ambient fluid medium.

6. The invention of claim 5 further characterized by a plurality of impact tubes connected to said second plurality of ports in such manner as to cause them to extend within said plurality of tail pipe means, respectively.

7. The device of claim 5 further characterized by:

a third plurality of ports respectively disposed in the walls of said rearwardly extending, open-ended tail pipe means at locations along the lengths thereof having cross-sectional areas that are greater than the aforesaid given cross-sectional areas;

a fourth plurality of ports respectively disposed in the walls of said rearwardly extending, open-ended tail pipe means at other locations along the lengths thereof having cross-sectional areas that are greater than the aforesaid given cross-sectional area;

another plurality of pipe means respectively connected between said third and fourth pluralities of ports and the aforesaid plurality of pipe means respectively connected between the aforesaid first and second pluralities of ports; and valve means located in each of the pipe means of the aforesaid pluralities of pipe means for effectively closing predetermined ones of said second, third, and fourth pluralities of ports in response to predetermined signals, respectively.

8. The invention of claim 7, wherein said predetermined signals for respectively closing said valve means are manual adjustments of a human operator.

9. The invention of claim 7 further characterized by:
a power supply; and
a selector switch connected between the output of said power supply and the inputs of said valve means for selectively supplying said predetermined signals thereto.

10. The invention of claim 9 further characterized by means, enclosing said interconnected power supply and selector switch, connected to the aforesaid sonic energy producing generator for the powering thereof along a predetermined course within said predetermined ambient fluid medium.

11. A generator for producing sonic energy within a predetermined ambient fluid medium in response to being towed therein in such manner that said fluid medium simultaneously flows effectively therearound and operatively therethrough, comprising in combination:

a first open-ended pipe means, having a front converging section, a throat section, and a rear diverging section, adapted for receiving and carrying a flowing portion of said predetermined fluid medium in response to being towed therethrough;

a plurality of rearwardly extending, open-ended tail pipe means connected to each other and to the rear end of said rear diverging section of said first pipe means in such manner as to form a common junction thereat and be capable of receiving the aforesaid portion of flowing fluid medium therefrom;

a first plurality of ports, identical in number to the aforesaid plurality of rearwardly extending, open-ended tail pipe means, respectively disposed in substantial alignment therewith in the wall of the rear diverging section of said first pipe means at predetermined locations along the length thereof having given cross-sectional areas;

a second plurality of ports respectively disposed in the walls of said rearwardly extending, open-ended tail pipe means at locations along the lengths thereof having cross-sectional areas that are greater than the aforesaid given cross-sectional areas;

a plurality of manifolds, each of which has a plurality of branch pipes, respectively connected between said first and second pluralities of ports;

a plurality of control valves respectively disposed in the plurality of branch pipes of said plurality of manifolds, each of which is capable of being opened and closed in response to predetermined signals;

a power supply;

switch means connected between the output of said power supply and the inputs of said plurality of control valves for selectively supplying said opening and closing signals thereto;

housing means of predetermined geometrical configuration enclosing said generator, with the exceptions of the affluent front entrance of the first open-ended pipe means thereof and the effluent rear exit ends of the plurality of open-ended tail pipe means thereof, thereby permitting the aforesaid predetermined fluid medium to flow therethrough;

buoyant means disposed with the upper portion of said housing means;

ballast means disposed within the lower portion of said housing means;

bridle means effectively connected to the front end of said first open-ended pipe means; and means connected to said bridle means for supplying a forward motive force thereto.

* * * * *